US008341710B2

(12) United States Patent
Tyree

(10) Patent No.: US 8,341,710 B2
(45) Date of Patent: Dec. 25, 2012

(54) UBIQUITOUS WEBTOKEN

(75) Inventor: David S Tyree, Centreville, VA (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 490 days.

(21) Appl. No.: 12/637,451

(22) Filed: Dec. 14, 2009

(65) Prior Publication Data

US 2011/0145897 A1 Jun. 16, 2011

(51) Int. Cl.
*G06F 7/04* (2006.01)
(52) U.S. Cl. .............................. 726/6; 713/171; 713/172
(58) Field of Classification Search .................. 713/168, 713/171, 172; 726/6, 9
See application file for complete search history.

(56) References Cited

U.S. PATENT DOCUMENTS

| | | | | |
|---|---|---|---|---|
| 5,784,463 A * | 7/1998 | Chen et al. | ..................... | 713/171 |
| 2004/0064706 A1 * | 4/2004 | Lin et al. | ..................... | 713/182 |
| 2004/0143730 A1 * | 7/2004 | Wen et al. | ..................... | 713/150 |
| 2004/0177369 A1 * | 9/2004 | Akins, III | ..................... | 725/31 |
| 2005/0235148 A1 * | 10/2005 | Scheidt et al. | ................ | 713/168 |
| 2006/0285692 A1 * | 12/2006 | Kerstens et al. | .............. | 380/270 |
| 2008/0168544 A1 * | 7/2008 | von Krogh | ........................ | 726/6 |
| 2009/0248827 A1 * | 10/2009 | Hazra et al. | ................... | 709/207 |
| 2011/0154030 A1 * | 6/2011 | Hazra et al. | ................... | 713/164 |

* cited by examiner

*Primary Examiner* — Samson Lemma

(57) ABSTRACT

A first device receives, from a second device, a first request to set up an account, where the first request includes a shared key and information associated with the second device, where the shared key is calculated based on a private key, of a private key/public key pair, and information regarding an identity selection, from user identity information, associated with a user of the second device; and store the shared key in a memory. The first device receives, from the second device, a second request to log in to the account, where the second request includes a first webtoken and information associated with the second device, where the first webtoken is calculated based on the shared key and a first time interval; retrieves the shared key; generates a second webtoken based on the shared key and a second time interval; performs an authentication operation by comparing the first webtoken and the second webtoken; and permits the second device to access the account when the first webtoken matches the second webtoken.

20 Claims, 12 Drawing Sheets

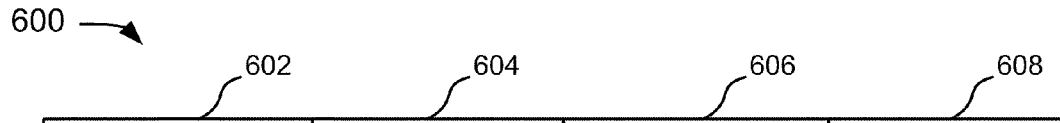

| 600 → | 602 | 604 | 606 | 608 |
|---|---|---|---|---|
| IDENTITY NAME | jsmith@acmemail.com | John.smith@zmail.com | js@anonymail.com |
| Legal Name | Jonathon J. Smith | John Smith | - |
| Email Address | jsmith@acmemail.com | John.smith@zmail.com | - |
| Physical Address | 8th St., New York, NY | 10th Ave., New York, NY | - |
| Billing Address | 8th St., New York, NY | 10th Ave., New York, NY | - |
| Shipping Address | 8th St., New York, NY | 10th Ave., New York, NY | - |
| Organization Name | Acme Business | - | - |
| Telephone Number | 202-222-2222 | 202-333-3333 | - |
| Name Validation (Yes/No) | Yes | Yes | No |
| Email Validation (Yes/No) | Yes | Yes | No |
| Address Validated (Yes/No) | Yes | Yes | No |
| Telephone Validated (Yes/No) | Yes | Yes | No |
| Age Validated (over 18) (Yes/No) | No | Yes | No |
| Age Validated (over 21) (Yes/No) | No | Yes | No |
| IDENTITY SAVED (Yes/No) | Yes | Yes | Yes |
| IDENTITY ACTIVATED (Yes/No) | Yes | Yes | Yes |

FIG. 6A

UBIQUITOUS WEBTOKEN

BACKGROUND INFORMATION

As the Internet and the numbers of users, of the Internet, continue to grow, measures to enhance security are becoming more important. Websites, service providers and users alike are employing new technologies and protocols to better safeguard sensitive information and reduce the incidence of online identity theft and/or fraud.

A number of websites are improving security measures by incorporating two-factor authentication methodologies into website access protocols. Authentication methodologies generally involve one or more of three basic factors: something the user knows (e.g. username, password, personal identification number (PIN), answers to challenge questions, etc.); something the user physically possesses (e.g., ATM card, token device, smartcard, etc.); and some user characteristic (e.g., user biometric characteristics, such as fingerprints, facial characteristics, DNA sequences, retina patterns, etc.). While many websites may require only a single authentication factor, such as a knowledge-based authentication factor (e.g., something the user knows), an increasing number of websites are beginning to require two-factor authentication and issue authentication devices, such as tokens and smartcards, to registered users to comply with the second, physical authentication factor (e.g., something the user physically possesses). The form factor of a typical device may allow a user to attach a token device to the user's key chain or to secure a smartcard in the user's wallet or purse.

While a device, such as a token and/or smartcard, may provide for effective second-factor authentication, a particular device only works with the particular issuing website. Moreover, because methods of implementing devices are not widespread, standardized and/or universally implemented, websites requiring two-factor authentication may incur the considerable expense and resources to procure, issue and/or administer website-unique devices. Consequently, users may accumulate increasing numbers of website-unique devices and may need to bear the burden of possessing, transporting, managing and using multiple devices, of varying types and protocols to access a number of different websites.

BRIEF DESCRIPTION OF THE DRAWINGS

FIG. 6A is a diagram of an exemplary identity registration table capable of being used by an exemplary portion of the network of FIG. 2;

DETAILED DESCRIPTION OF PREFERRED EMBODIMENTS

Figure 1:
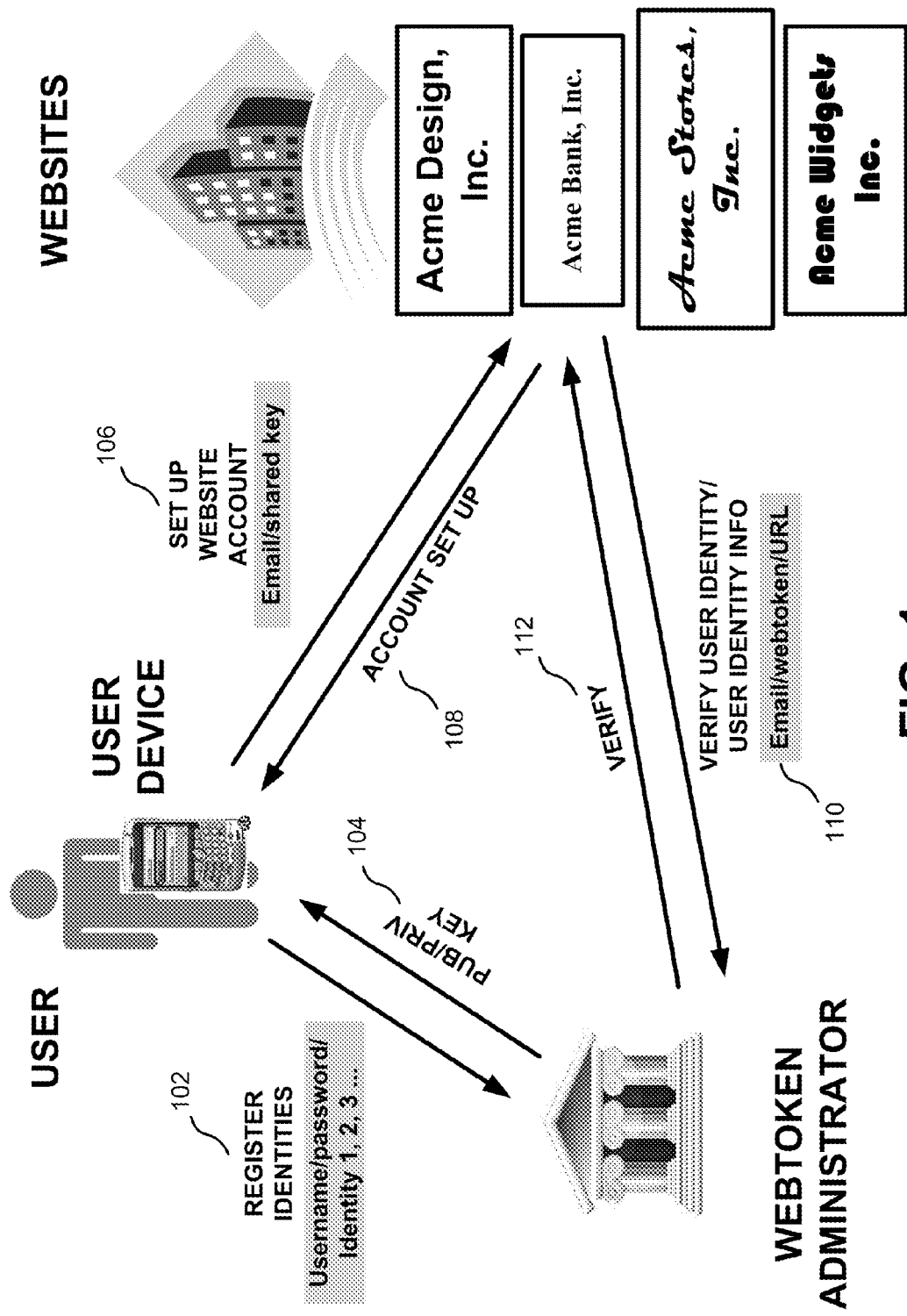
FIG. 1 is a diagram of an overview of a ubiquitous webtoken implementation described herein.

The following detailed description refers to the accompanying drawings. The same reference numbers in different drawings may identify the same or similar elements. Also, the following detailed description does not limit the invention.

Systems and/or methods described herein may provide a ubiquitous webtoken (hereinafter referred to as "webtoken") that enables a multitude of websites to implement a two-factor authentication methodology, at little-to-no cost, while relieving a user of the burden of carrying and managing multiple authentication devices, such as smartcard, token devices and/or other authentication devices.

A webtoken may be generated by a single user device, using a publicly available ubiquitous webtoken application, stored on a user device, that generates webtokens and/or shared keys (hereinafter referred to as the "UWT application"). Furthermore, websites may receive webtokens from a number of user devices and, using the same publicly available algorithm (e.g., the UWT application), may authenticate the number of user devices.

A webtoken, as used herein, may include a string of characters (e.g., numeric, alphabetic, or alphanumeric) that may be cryptographically calculated, from a key and a time interval. The derivation of the key, from the webtoken, may be rendered cryptographically infeasible (e.g., impractical given the present and projected state of technology or mathematical practice). In one example, the webtoken may be time-variant (e.g., changes over time), such that a webtoken generated (e.g., by the UWT application) at a particular time of day may be different from a webtoken that is generated at a different time of day depending on the time interval, which may determine the life of the webtoken.

In another example, the webtoken may be generated from a shared key that may be unique to a particular website and which may be derived from a key associated with a particular user and/or user device. The shared key may include a string of characters (e.g., numeric, alphabetic, or alphanumeric) that may be cryptographically calculated from a key, such as a private key of a private key/public key pair, associated with the identity of the user of the user device. In yet another example, the shared key may be a time-invariant (e.g., remains constant over time) string of characters and may be cryptographically calculated (e.g., by the UWT application) from a particular domain name, a certain identity selection associated with the user, and/or a private key, such that the derivation of the private key, from the shared key, may be rendered cryptographically infeasible. Therefore, a unique shared key may be generated and sent to each website that requires two-factor authentication and has acquired the publicly available UWT application A user device may enable and use the shared key and/or webtoken by registering with one or more entities that serve as a certification authority of public key/private key pairs; issue and/or administer private key/public key pairs and/or certificates; and/or register and/or verify identities of a particular user of a user device (hereinafter referred to as a "webtoken administrator"). A user may register a user device by providing particular identity information associated with the user of a user device to a webtoken administrator and, in return, may receive a private key/public key pair and the UWT application that may be downloaded to the user device.

As will be described herein, a user device may access a particular website, requiring two-factor authentication, using a shared key and/or a webtoken. The user of a user device may satisfy the knowledge-based authentication factor of a two-factor authentication scheme by providing, to a particular website, shared secret information, known only by the user and the website, such as a username, password, personal identification number (PIN), and/or challenge question, etc. Additionally, the user device may satisfy the physical authentication factor of a two-factor authentication scheme by providing, to the particular website, shared secret information known only by the user device and website, such as a shared key and/or a webtoken. A multitude of unique webtokens and/or shared keys may be generated from a single device (e.g., a user device), rather than a number of authentication devices (e.g., tokens, smartcards and/or other authentication devices), and sent to a multitude of websites requiring two-factor authentication. Moreover, the multitude of websites may receive webtokens and/or shared keys to authenticate a user device by simply acquiring a universally available UWT application that may be available to the public. The website may, thus, enhance security by adopting two-factor authentication protocols while avoiding the expense and infrastructure needed to issue and administer a multitude of authentication devices.

FIG. 1 is a diagram of an overview of a webtoken implementation described herein. As shown in FIG. 1, a user device may interact with a webtoken administrator for purposes of registering one or more identities associated with a user of a user device, in return for a private key/public key pair. The user device may also interact with one or more websites requiring two-factor authentication to set up account access and/or to access the account at the particular website once the account access is set up. Websites may interact with the user device to set up account access and to authenticate the user device prior to granting access to the account. Furthermore, websites may interact with a particular webtoken administrator to obtain two-factor authentication of a user device and/or to receive identity information associated with, and authorized by, the user during the registration process with the webtoken administrator.

In one example, the user device may register with a webtoken administrator by setting up one or more identities 102 associated with the user of the user device. One user identity may be associated with the user's work email address with which the user may associate only certain personal information (e.g., the user's work telephone number, work address, employer organization, etc.). Another user identity may be associated with a user's personal email address with which the user may associate the same or different personal information (e.g., the user's home telephone number, home address, full name, etc.). In addition, or instead of, to the personal and/or business identities, the user may set up a number of other particular identities, each associated with a particular email address. In return for registering the user device, the webtoken administrator may send a private key/public key pair 104 and a UWT application to the user device for use in accessing any website accepting webtokens and/or shared keys.

In another example, the user, of the user device, may set up an account 106 with a particular website requiring two-factor authentication (e.g., Acme Bank, Inc.'s website with a domain name of "acmebank.com"). The website may receive a request from the user device to set up an account and may receive information associated with the user device (e.g., username, password, PIN and/or challenge question, etc.) to satisfy the knowledge-based authentication factor. Furthermore, the user device may generate a shared key and may send the shared key to the particular website to enable the second, physical authentication factor. For example, the user device may retrieve the UWT application and the private key (i.e., the private key from the private key/public key pair) from the memory of the user device. The UWT application may prompt the user to enter, into the user device, the domain name associated with the particular website (e.g., acmebank.com) and a certain user identity selection regarding the amount of identification information the user wishes to disclose to the website. The UWT application may cryptographically calculate a time-invariant shared key that is unique to the particular website and which is derived from the private key, the domain name, and the user identity selection.

The user device may send the shared key together with the user's email address to the website. The user device may also send information associated with the shared key (e.g., the domain name and/or a user identity selection) to the webtoken administrator. The website may set up two-factor authentication access for the user device 108 and may store the shared key and email address to authenticate the user device when the user later logs into the website.

In yet another example, the particular website may be affiliated with the webtoken administrator that registered the user device and may receive identity verification services from the webtoken administrator. In this case, the particular website (e.g., Acme Bank, Inc.) may utilize the UWT application to cryptographically calculate a time-variant webtoken from the shared key received from the user device. The website may send a request for identity verification services to the webtoken administrator 110, which may include an email address associated with the user device, the webtoken and/or the website domain address (e.g., acmebank.com). The webtoken administrator may retrieve from memory, the identity information (e.g., from the registered identities) associated with the email address received from the website. From the identity information, the webtoken administrator may identify shared key information associated with the domain name received from the website (e.g., acmebank.com) and may utilize the UWT application to generate a second webtoken for comparison with the webtoken received from the website. If the webtokens match, the webtoken administrator may verify the user identity, such that the email address corresponds to the user of the user device and is associated with the webtoken received from the website 112. Furthermore, the webtoken administrator may determine, from the user identity selection specified when generating the unique shared key for the particular website, the amount of user identity information to disclose to the website.

In still another example, the user of a user device may wish to access a particular website in which two-factor authentication account access has been set up (e.g., Acme Bank, Inc.'s website). The user may send information associated with the user (e.g., username, password, PIN and/or challenge question, etc., to satisfy the first knowledge-based authentication factor). The user device may generate a first webtoken from the shared key that was previously generated for the particular website and may send the first webtoken to the particular website. The website may retrieve, from memory, the shared key associated with the user device and, from the shared key, may generate a second webtoken. The website may authenticate the user device if the first and second webtokens match.

Figure 2:
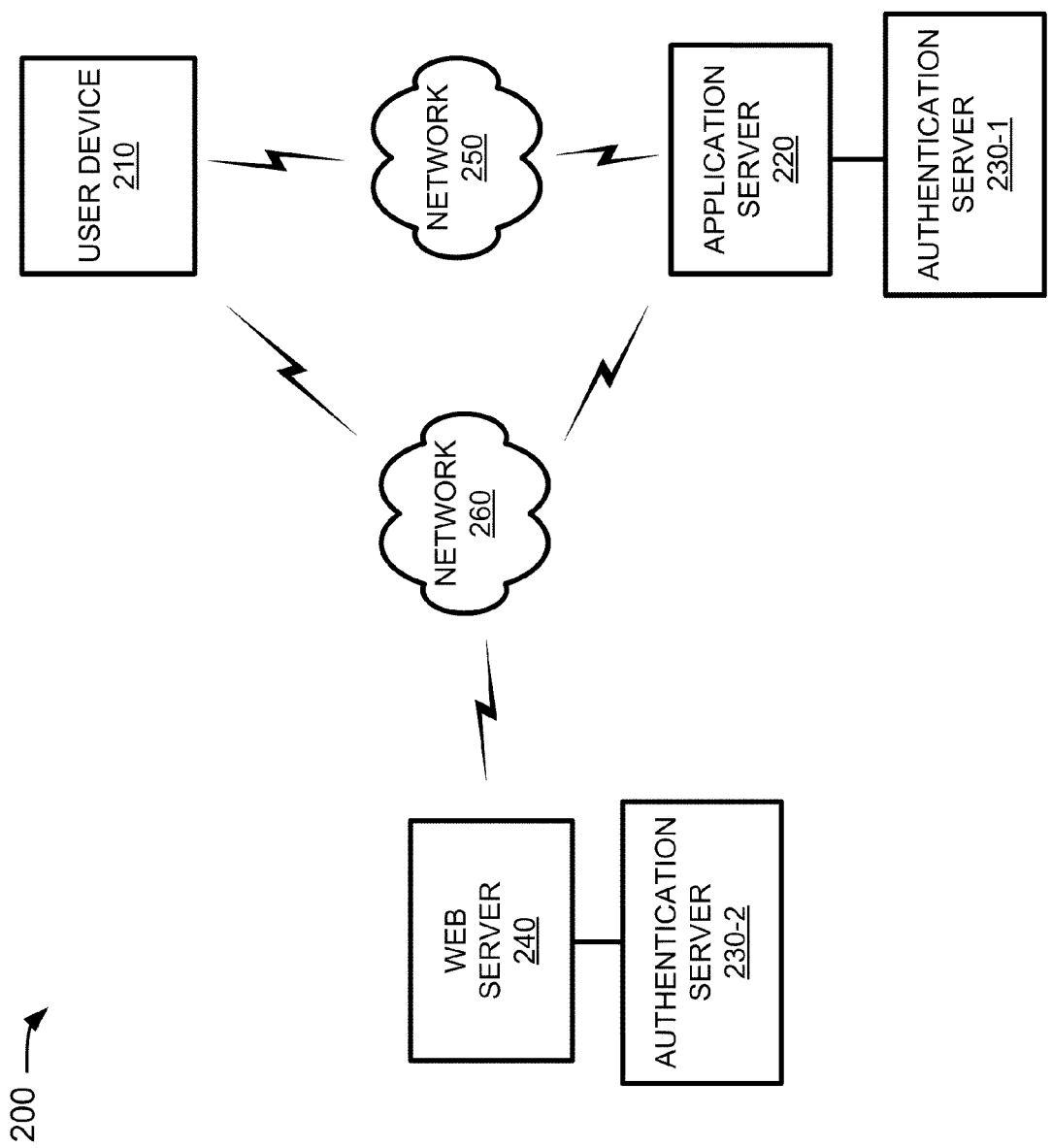
FIG. 2 is a block diagram of an exemplary network in which systems and/or methods described herein may be implemented.

FIG. 2 is a diagram of an exemplary network 200 in which systems and/or methods described herein may be implemented. Network 200 may include a user device 210, an application server 220, an authentication server 230-1, an authentication server 230-2, a web server 240, a network 250 and/or a network 260. Components of network 200 may interconnect via wired and/or wireless connections. In other words, any two components, of network 200, may communicate via a wired connection, a wireless connection, or a combination of a wired connection and a wireless connection.

A single user device 210, application server 220, authentication server 230-1, authentication server 230-2, web server 240, network 250 and network 260 are illustrated in FIG. 2 for simplicity. In practice, there may be additional or fewer user devices 210, application servers 220, authentication servers 230-1, authentication servers 230-2, web servers 240, networks 250 and/or networks 260. Also, in some implementations, one or more of the devices of network 200 may perform one or more functions described as being performed by another one or more of the devices of network 200. For example, application server 220 and authentication server 230-1 could be integrated into a single device that performs all or some of the functions described below as being performed by an individual one of these devices. Similarly web server 240 and authentication server 230-2 could be integrated into a single device that performs all or some of the functions described below as being performed by an individual one of these devices.

User device 210 may include any computation or communication device, such as a communication device that is capable of communicating with application server 220 and/or web server 240, via network 250 and/or network 260, respectively. For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a set-top box (STB), a television, a personal gaming system, or another type of computation or communication device. In one implementation, user device 210 may generate or store one or more unique shared keys and/or webtokens for a number of websites that may enable the user device to access these websites. In another implementation, user device 210 may register one or more user identities with a webtoken administrator and, in return, may receive a private key/public key pair and a UWT application that may enable user device 210 to generate one or more shared keys and/or webtokens.

The description to follow will generally refer to user device 210 as a wireless communication device. The description is not limited, however, to a wireless communication device and may equally apply to other types of user devices.

Application server 220 may include one or more server devices, or other types of computation or communication devices, that gather, process, search, store, and/or provide information in a manner similar to that described herein. Application server 220 may interface with user device 210 and may interface with other servers, such as web server 240, authentication server 230-1 and/or authentication server 230-2. In one implementation, application server 220 may perform the function of webtoken administrator and may issue private key/public key pairs and/or UWT applications, etc. Furthermore, as webtoken administrator, application server 220 may administer private key/public key pairs by ensuring that user devices 210 receive updated private key/public key pairs prior to expiration and/or to ensure that public/private key pairs are authorized for each corresponding registered user and/or user device 210. For example, application server 220 may authenticate user device 210 and/or may respond to requests from user device 210 to register particular identity information associated with a user (e.g., a user of user device 210). Application server 220 may generate and send a private key/public key pair and/or a UWT application to user device 210.

In another implementation, application server 220 may perform the function of identity manager in addition to, or instead of, webtoken administrator. For example, application server 220 may receive a request from one or more web servers 240 to perform two-factor authentication operations. In response to the request, application server 220 may provide user identity verification services and/or provide particular identity information, associated with a user and/or user device 110, to web servers 240. Additionally, application server 220 may retrieve information from memory and may generate a shared key and/or a ubiquitous webtoken, by employing the UWT application, to compare with information received from web server 240 for the purposes of performing a two-factor authentication operation.

Authentication server 230-1 may include one or more server devices, or other types of computation or communication devices, that gather, process, search, store, and/or provide information in a manner similar to that described herein. Authentication server 230-1 may interface with application server 220. In one implementation, authentication server 230-1 may authenticate user device 210. For example, authentication server 230-1 may receive, from application server 220, a request to authenticate a user (e.g., a user of user device 210) based on information associated with the user (e.g., username, password, PIN, etc.). In another implementation, authentication server 230-1 may perform two-factor authentication operations. For example, authentication server 230-1 may receive, from application server 220, a request to provide a two-factor authentication of a user (e.g., a user of user device 210). The request may include information associated with the user, a webtoken, an email address associated with the user and/or a domain address associated with a particular website (e.g., a website associated with web server 240). In another example, authentication server 230-1 may retrieve information from memory that may enable authentication server 230-1 to generate a shared key and/or a webtoken to compare with information received from application server 220 for the purpose of performing a two-factor authentication operation.

Authentication server 230-2 may include one or more server devices, or other types of computation or communication devices, that gather, process, search, store, and/or provide information in a manner similar to that described herein. Authentication server 230-2 may interface with one or more web servers 240. In one implementation, authentication server 230-2 may authenticate user device 210. For example, authentication server 230-2 may receive, from web server 240, a request to authenticate a user (e.g., a user of user device 210) based on information associated with the user (e.g., username, password, PIN, etc.). In another implementation, authentication server 230-2 may perform two-factor authentication operations. For example, authentication server 230-2 may receive, from web server 240, a shared key and/or a webtoken and may store the shared key and/or webtoken in memory (e.g., memory associated with authentication server 230-2 and/or web server 240). Authentication server 230-2 may authenticate a user (e.g., a user of user device 210), in response to a request received from web server 240, and may generate a webtoken from the shared key associated with the user and retrieved from memory, for the purpose of performing the authentication operation.

Web server 240 may include one or more server devices, or other types of computation or communication devices, that gather, process, search, store, and/or provide information in a manner similar to that described herein. Web server 240 may interface with user device 210 and may interface with other servers, such as application server 220, authentication server 230-2 and/or authentication server 230-1. Web server 240 may present a website that may be accessed by user device 210 or other server devices described herein. In one implementation, web server 240 may interface with user devices 210 to allow access to accounts and/or website content, to provide services, to exchange information, to send/receive messages, to facilitate online purchases and/or to close accounts. For example, web server 240 may present a website for a bank that enables users to manage their accounts and/or perform transactions in a secure manner. In another example, web server 240 may present a website for a retail store that enables a user to browse retail items offered for sale by the website and/or to perform transactions to purchase goods online. In another implementation, web server 240 may set up user accounts utilizing two-factor authentication protocols. For example, web server 240 may respond to requests from user device 210 to set up an account with two-factor authentication access where the physical authentication factor may be satisfied with a webtoken and/or a shared key.

Network 250 and/or network 260 may include a local area network (LAN), a wide area network (WAN), a metropolitan area network (MAN), a telephone network (e.g., the Public Switched Telephone Network (PSTN), or a cellular network, such as the Public Land Mobile Network (PLMN)), an intranet, the Internet, a fiber optic-based network, or a combination of networks.

Although not shown in FIG. 2, network 200 may include a variety of other devices, such as a database, a self-provisioning server, etc. Each of these devices may perform certain functions described briefly below. Any of these functions may be performed by application server 220 and/or web server 240. Thus, one or more of these devices may be integrated into application server 220 and/or web server 240.

The database may include a device that stores private key/public key pairs, certificates, UWT applications, user identity information (e.g., email addresses, physical addresses, home addresses, business addresses, names of employers, mobile telephone numbers, home telephone numbers, business telephone numbers, etc.), user identity selections associated with users' registered identity information and/or information associated with user devices 210 (e.g., usernames, passwords, PINs, mobile device numbers (MDNs), etc.) for retrieval by application server 220. The database may be maintained by application server 220 to temporarily store information associated with user devices 210, user identity information, shared keys, account information, etc.

The self-provisioning server may enable the registration of user device 210 and one or more identities associated with the user of user device. The self-provisioning server may facilitate sending the private key/public key pair and/or UWT application to user device 210.

Figure 3:
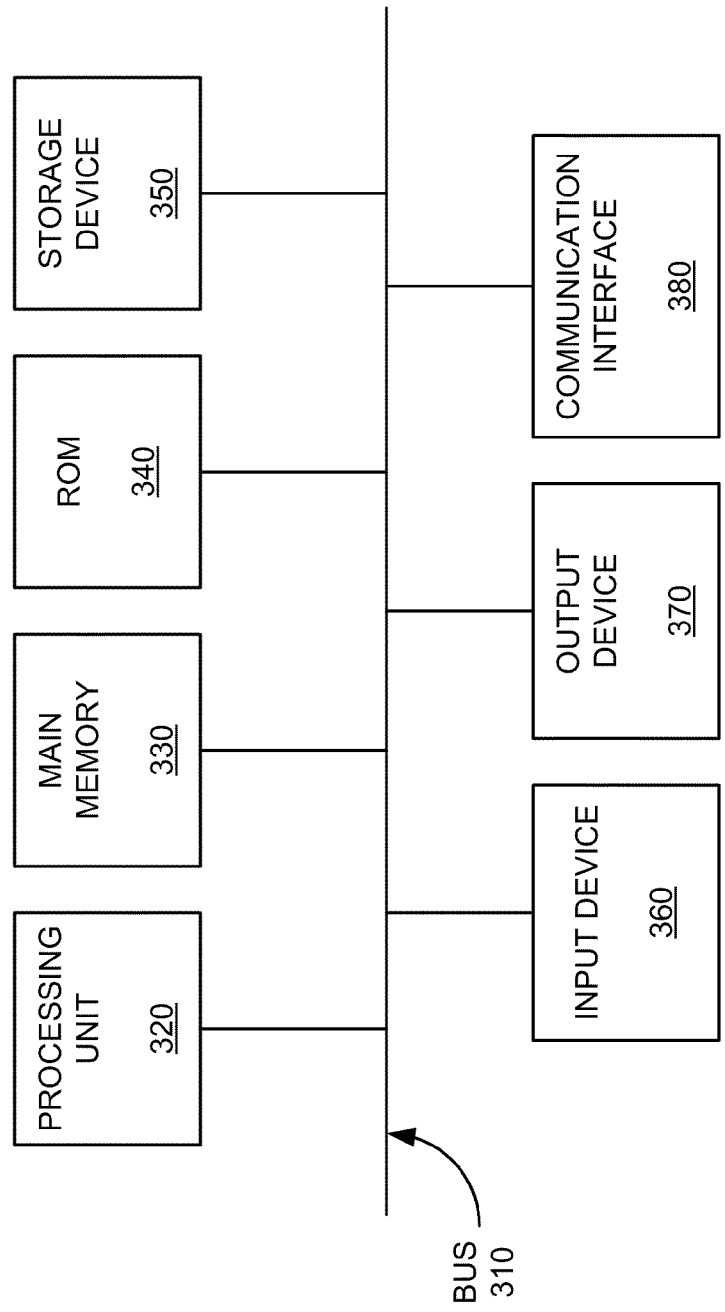
FIG. 3 is a diagram of exemplary components of one or more of the devices of FIG. 2.

FIG. 3 is a diagram of an exemplary device 300 that may correspond to application server 220, authentication server 230-1, authentication server 230-2 and/or web server 240. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include a processor, a microprocessor, an application-specific integrated circuit (ASIC), a field programmable gate array (FPGA), or another type of processing unit that may interpret and execute instructions. Main memory 330 may include a random access memory (RAM) or another type of dynamic storage device that may store information and instructions for execution by processing unit 320. ROM 340 may include a ROM device or another type of static storage device that may store static information and/or instructions for use by processing unit 320. Storage device 350 may include a magnetic and/or optical recording medium and its corresponding drive, or a type of flash memory.

Input device 360 may include a mechanism that permits an operator to input information into device 300, such as a keyboard, a mouse, a pen, a button, voice recognition and/or biometric mechanisms, a touch screen, etc. Output device 370 may include a mechanism that outputs information to the operator, such as a display, a speaker, a light emitting diode (LED), etc. Communication interface 380 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.) or a combination of wireless and wired communications. For example, communication interface 380 may include mechanisms for communicating with another device or system via a network, such as network 250 and/or network 260.

As described herein, device 300 may perform certain operations in response to processing unit 320 executing software instructions contained in a computer-readable medium, such as main memory 330. A computer-readable medium may be defined as a physical or logical memory device. A logical memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer, additional, different, or differently arranged components than depicted in FIG. 3. In still other implementations, one or more components of device 300 may perform one or more tasks described as being performed by one or more other components of device 300.

Figure 4:
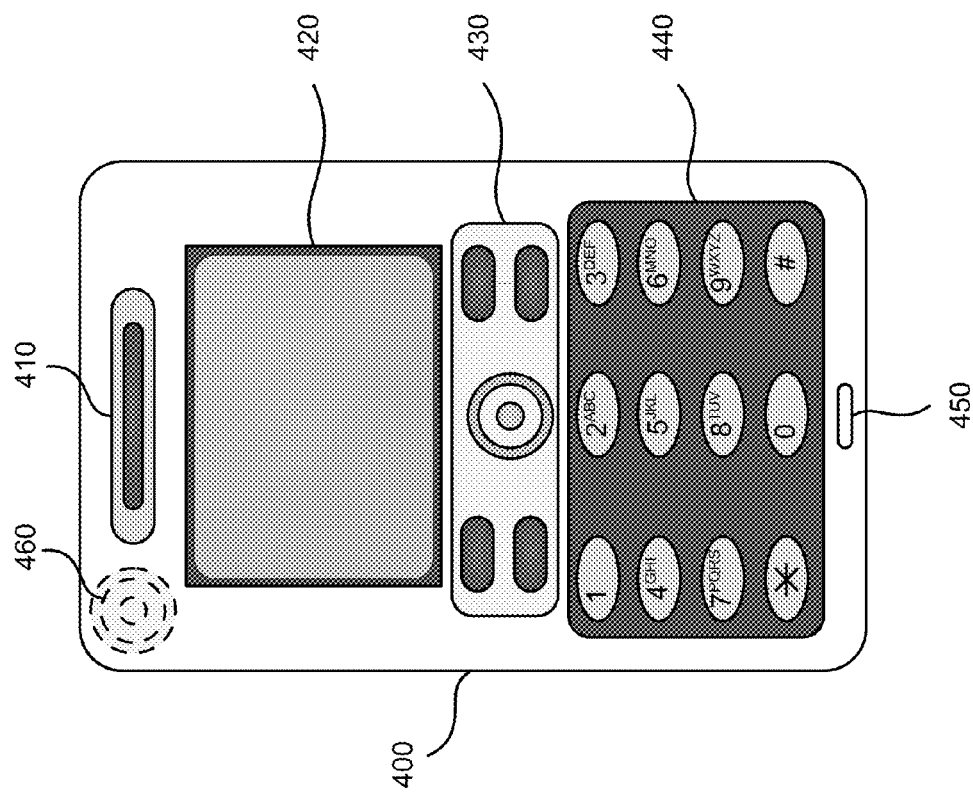
FIG. 4 is a diagram of an exemplary user device of FIG. 2.

FIG. 4 is a diagram of an exemplary user device 210. As shown in FIG. 4, user device 210 may include a housing 400, a speaker 410, a display 420, control buttons 430, a keypad 440, a microphone 450, and/or a camera 460. Housing 400 may include a chassis on which some or all of the components of user device 210 are mechanically secured and/or covered. Speaker 410 may include a component to receive input electrical signals from user device 210 and transmit audio output signals, which communicate audible information to a user of user device 210.

Display 420 may include a component to receive input electrical signals and present a visual output in the form of text, images, videos and/or combinations of text, images, and/or videos which communicate visual information to the user of user device 210. In one implementation, display 420 may display text input into user device 210, text, images, and/or video received from another device, and/or information regarding incoming or outgoing calls or text messages, emails, media, games, phone books, address books, the current time, etc.

Control buttons 430 may include one or more buttons that accept, as input, mechanical pressure from the user (e.g., the user presses a control button or combinations of control buttons) and may send electrical signals to processing unit 320 that may cause user device 210 to perform one or more operations. For example, control buttons 430 may be used to cause user device 210 to transmit information. Keypad 440 may include a standard telephone keypad or another arrangement of keys.

Microphone 450 may include a component to receive audible information from the user and send, as output, an electrical signal that may be stored by user device 210, transmitted to another user device, or cause the device to perform one or more operations. Camera 460 may be provided on a back side of user device 210, and may include a component to receive, as input, analog optical signals and send, as output, a digital image or video that can be, for example, viewed on the display 410, stored in the memory of user device 210, discarded and/or transmitted to another user device 210.

Although FIG. 4 depicts exemplary components of user device 210, in other implementations, user device 210 may contain fewer, additional, different, or differently arranged components than illustrated in FIG. 4. In still other implementations, one or more components of user device 210 may perform one or more tasks described as being performed by one or more other components of user device 210.

Figure 5:
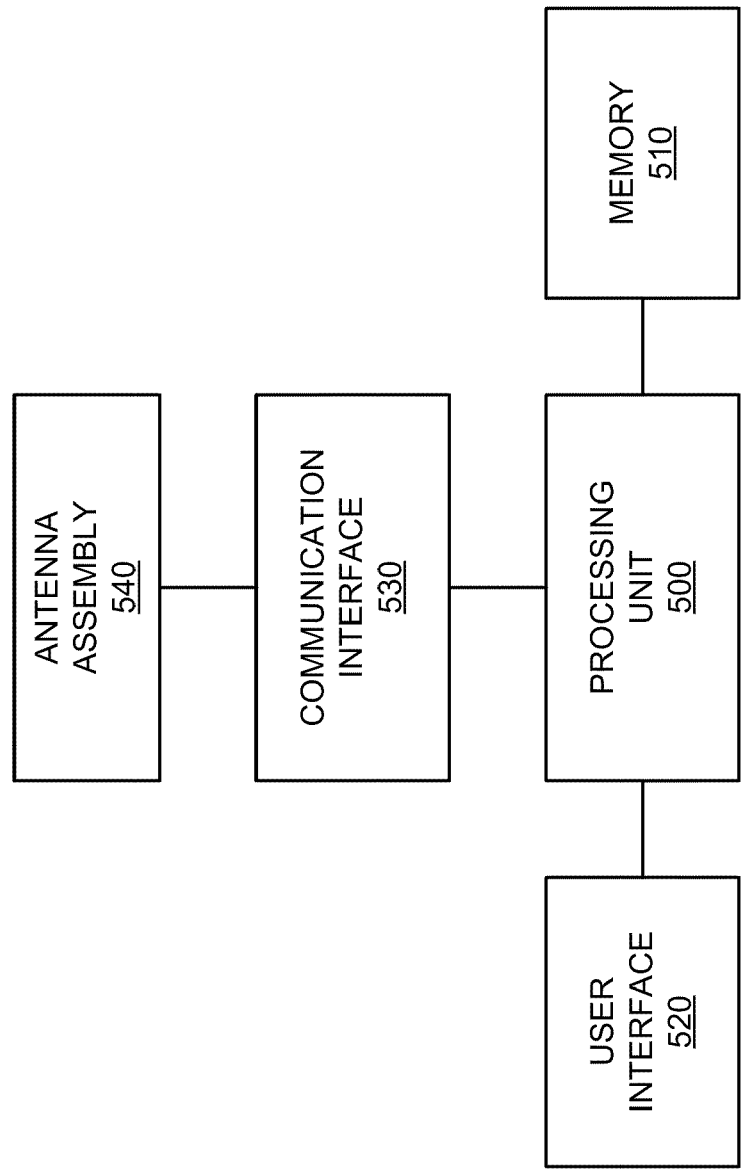
FIG. 5 is a diagram of exemplary components of the user device of FIG. 4.

FIG. 5 is a diagram of exemplary components of user device 210. As shown in FIG. 5, user device 210 may include a processing unit 500, a memory 510, a user interface 520, a communication interface 530, and/or an antenna assembly 540.

Processing unit 500 may include a processor, a microprocessor, an ASIC, a FPGA, or the like. Processing unit 500 may control operation of user device 210 and its components. In one implementation, processing unit 500 may control operation of components of user device 210 in a manner similar to that described herein. Memory 510 may include a RAM, a ROM, and/or another type of memory to store data and/or instructions that may be used by processing unit 500.

User interface 520 may include mechanisms for inputting information to user device 210 and/or for outputting information from user device 210. Examples of input and output mechanisms might include buttons (e.g., control buttons 430, keys of keypad 440 or a keyboard, a joystick, etc.); a touch screen interface to permit data and control commands to be input into user device 210; a speaker (e.g., speaker 410) to receive electrical signals and output audio signals; a microphone (e.g., microphone 450) to receive audio signals and output electrical signals; a display (e.g., display 420) to output visual information (e.g., webtokens, shared keys and/or web pages, etc.); a vibrator to cause user device 210 to vibrate; and/or a camera (e.g., camera 460) to receive video and/or images.

Communication interface 530 may include, for example, a transmitter that may convert baseband signals from processing unit 500 to radio frequency (RF) signals and/or a receiver that may convert RF signals to baseband signals. Alternatively, communication interface 530 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications. Communication interface 530 may connect to antenna assembly 540 for transmission and/or reception of the RF signals.

Antenna assembly 540 may include one or more antennas to transmit and/or receive RF signals over the air. Antenna assembly 540 may, for example, receive RF signals from communication interface 530 and transmit them over the air, and receive RF signals over the air and provide them to communication interface 530. In one implementation, for example, communication interface 530 may communicate with a network and/or devices connected to a network (e.g., network 250 and/or network 260).

As described in detail below, user device 210 may perform certain operations described herein in response to processing unit 500 executing software instructions of an application contained in a computer-readable medium, such as memory 510. The software instructions may be read into memory 510 from another computer-readable medium or from another device via communication interface 530. The software instructions contained in memory 510 may cause processing unit 500 to perform processes that will be described later. Alternatively, hardwired circuitry may be used in place of or in combination with software instructions to implement processes described herein. Thus, implementations described herein are not limited to any specific combination of hardware circuitry and software.

Although FIG. 5 shows exemplary components of user device 210, in other implementations, user device 210 may contain fewer, additional, different, or differently arranged components than depicted in FIG. 5. In still other implementations, one or more components of user device 210 may perform one or more tasks described as being performed by one or more other components of user device 210.

FIG. 6A is a diagram of an exemplary identity registration table capable of being used by an exemplary portion of the network 200. As illustrated in FIG. 6A, identity registration table 600 may associate particular user identity fields 602 with user identity information corresponding to one or more identities (e.g., 604-608), as specified by a user of a user device 210, when user device 210 registers with a webtoken administrator. Identity registration table 600 may be stored by the webtoken administrator (e.g., stored in the memory of application server 220) and may be subsequently retrieved when needed. For example, user device 210 may register one or more identities associated with the user of user device 210 that may include an identity regarding the user's place of business 604 (e.g., a user's business identity), an identity regarding the user's personal information 606 (e.g., a user's personal identity), an identity that may not include any personal or business information 608 (e.g., an anonymous identity that may include only an email address), and/or any number of identity permutations or combinations associated with the user.

As illustrated in identity registration table 600, a user of user device 210 may establish one or more identities by specifying a number of identity fields 602 for each identity that the user desires to establish, which may be stored in the identity registration table 600. For example, assume that a user of user device 210, is employed by Acme Business, Inc. and has established a business identity 604 associated with the user's employer. Registration table 600 may contain the user's business email address (e.g., "jsmith@acmemail.com") as the identity name field 602. Furthermore, registration table 600 may contain additional identifying information associated with the user's business identity, such as the user's legal name (e.g., Legal name: "Jonathon J. Smith"), business email address (e.g., email: "jsmith@acmemail.com"), business telephone number (e.g., phone no.: "202-222-2222"), business physical address (e.g., physical address: "$8^{th}$ St., New York, N.Y."), shipping address (e.g., shipping address: "$8^{th}$ St., New York, N.Y."), billing address (e.g., billing address: "$8^{th}$ St., New York, N.Y.") and/or business or employer name (e.g., Org. Name: "Acme Business").

Identity registration table 600 may also include anonymous identity fields 602 that enable the user to reveal some identity information while preserving anonymity with respect to a particular identity or identity field 602. For example, when a user generates a shared key, the user may select user identity information, associated with the user's business identity 604, which specifies the type and/or amount of identity information that the user wishes to share with a particular website without revealing all of the information associated with the user's business identity 604. A user may enable (e.g., "yes") or disable (e.g., "no") anonymous identity fields, such as validation of the user's name, an email address, any of the physical, shipping and/or billing addresses, a telephone number, whether the user is over eighteen and/or whether the user is over twenty-one, without revealing an actual name, email address, any of the physical, shipping and/or billing addresses, a telephone number or the user's age. While the website may not receive personal information pertaining to the user, the website may nonetheless authenticate the user on the basis that a webtoken received from the user may correspond to user device 210 and/or the identity of the user, albeit undisclosed. In the present example, the user may enable certain anonymous identity fields, such as name validated (e.g., "yes"), email validated (e.g., "yes"), address validated (e.g., "yes") and telephone number validated (e.g., "yes").

In another example, assume a user of user device 210, has established a personal identity 606. The registration table 600 may contain the user's personal email address (e.g., "john.smith@zmail.com) as the identity name field 602. Furthermore, registration table 600 may contain additional identifying information associated with the user's personal identity, such as the user's legal name (e.g., Legal name: "John Smith"), personal email address (e.g., email: "john.smith@zmail.com"), home or mobile device number (e.g., phone no.: "202-333-3333"), physical address (e.g., physical address: "$10^{th}$ Ave., New York, N.Y."), shipping address (e.g., shipping address: "$10^{th}$ Ave., New York, N.Y."), billing address (e.g., billing address: "$10^{th}$ Ave., New York, N.Y.") and/or business or employer name (e.g., left blank). The user may also have enabled the anonymous identity fields, such as name validated (e.g., "yes"), email validated (e.g., "yes"); address validated (e.g., "yes"); telephone number (e.g., "yes"); age validated (over age eighteen) (e.g., "yes") and/or age validated (over twenty-one) (e.g., "yes").

In yet another example, assume that a user of user device 210, has established an anonymous identity 608. The registration table 600 may contain the user's anonymous email address (e.g., "js@anonymail.com) as the identity name field 602 while all other identity fields 602 may be left blank.

When the identities associated with the user have been established, the user may select whether one or more of the identities are to be activated for use by the user when accessing a website requiring two-factor authentication. The webtoken administrator (e.g., application server 220), may store the registration identity table 600 in memory.

Figure 6B:
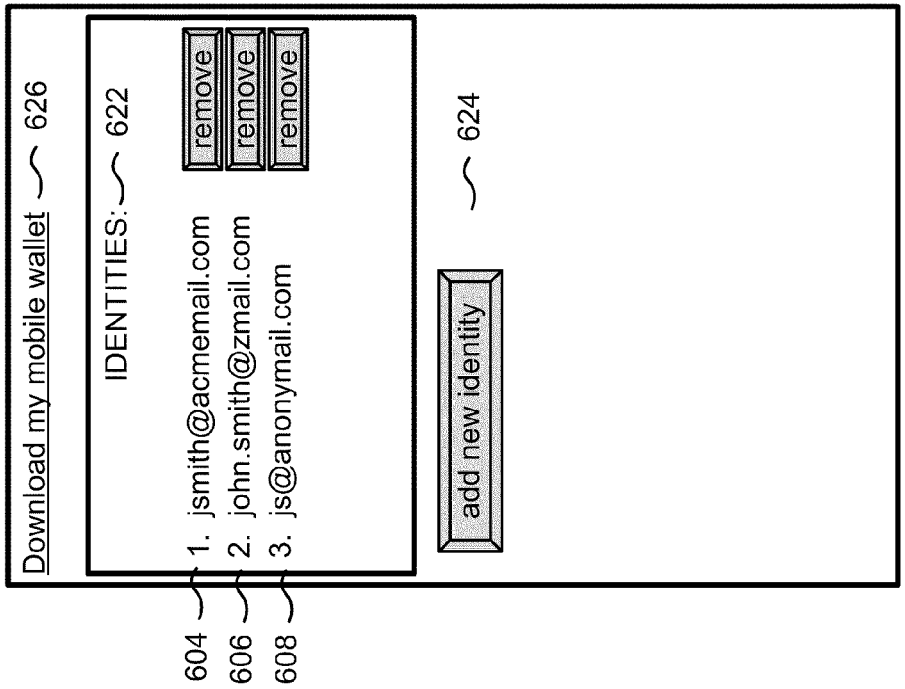
FIG. 6B is a diagram of an exemplary ubiquitous token user interface capable of being presented on the user device of FIG. 2.

FIG. 6B is a diagram of an exemplary webtoken registration user interface 620 capable of being presented on user device 210 in FIG. 2. Webtoken registration user interface 620, depicted in FIG. 6B, may correspond to a graphical user interface (GUI) or a non-graphical user interface. The user interface may provide information to the user via a customized interface (e.g., proprietary interface) and/or other types of interfaces (e.g., browser-based interfaces, television interfaces, etc.). The user interface may receive user inputs via one or more input devices (e.g., input device 360), and/or may be user-configurable (e.g., a user may change the size of the user interface, information displayed in the user interface, color schemes used by the user interface, positions of text, images, icons, windows, etc., in the user interface, etc.). The user interface may be displayed to the user via an output device (e.g., display 420).

As illustrated in FIG. 6B, user interface 620, and user interface data elements 622-626, may enable a user of user device 210 to view, edit and/or remove identities that have been registered and saved as described above (FIG. 6A). For example, user interface 620 may provide the saved identity names associated with the user (e.g., (1) jsmith@acmemail.com; (2) john.smith@zmail.com and (3) js@anonymail.com). The user may remove one or more saved identities by selecting the remove button corresponding to the particular identity to be removed. Furthermore, a user may edit a saved identity by selecting the identity name (e.g., email address) corresponding to the identity the user desires to edit, which may cause particular identity information, such as that contained in the identity registration table 600 (FIG. 6A), to be displayed for editing. If the user wishes to add a new identity, the user may select data element 624. The identities may be downloaded to user device 210 by selecting data element 626.

Although user interface 620 and data elements 622-626 depict a variety of information, in other implementations, user interface 620 and data elements 622-626 may depict fewer, additional, different, or differently arranged information and/or identities than depicted in FIG. 6B. Furthermore, although certain features associated with identity registration have been described above in connection with FIGS. 6A and 6B, in other implementations, fewer, additional, different, or differently arranged features, than described above in connection with FIGS. 6A and 6B, may be associated with identity registration.

Figure 7:
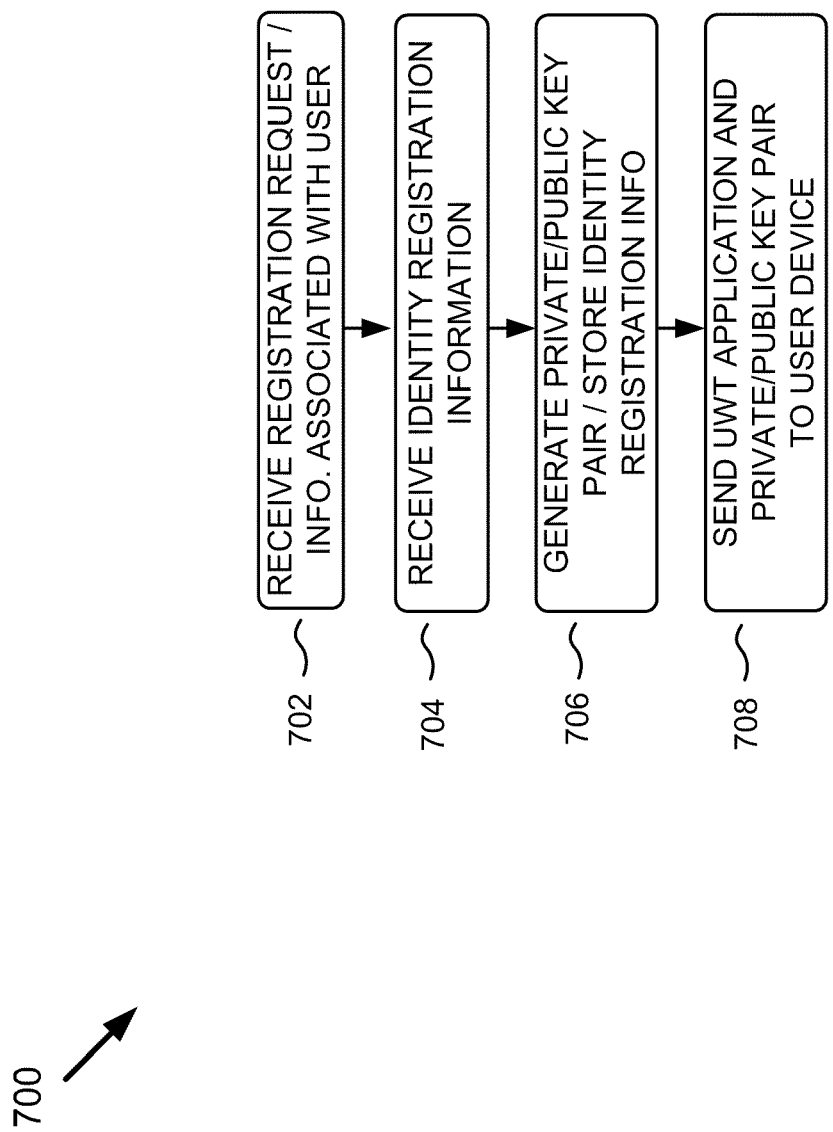
FIG. 7 is a flow chart of an exemplary process for identity registration of a user of a user device.

FIG. 7 is a flow chart of an exemplary process 700, for identity registration for user device 210, performed within an exemplary portion of network 200 (FIG. 2). In one implementation, some or all of process 700 may be performed by application server 220 interfacing with user device 210, authentication server 230-1, authentication server 230-2 and/or web server 240. In another implementation, some or all of process 700 may be performed by one or more devices separate from or in combination with application server 220.

Process 700, of FIG. 7, may include receiving a registration request from user device 210 (block 702). A registration request may be sent to application server 220, from user device 210, when the user, of user device 210, desires to gain access to a website requiring two-factor authentication using a webtoken. The user may register user device 210 and may receive a private key/public key pair and a UWT application in order to generate a shared key and/or a webtoken. For example, application server 220 may receive a request to register user device 210 and/or one or more user identities, from user device 210. The request may include information associated with the user and/or user device 210 (e.g., MDN, username, password and/or PIN, etc.).

Identity registration information, associated with user device 210, may be received (block 704). For example, application server 220 may receive information associated with user device 210 and may request, from user device 210, user identity registration information. In response to the request, user device 210 may provide information corresponding to one or more identities (e.g., the identities shown in identity registration table 600, of FIG. 6A) associated with the user of user device 210.

A private key/public key pair may be generated and identity registration information may be stored in memory (block 706). For example, application server 220 may receive identity registration information from user device 210 and may store the registration identity information as an identity registration table (e.g., similar to identity registration table 600, of FIG. 6A) in the memory of application server 220. Application server 220 may generate a private key/public key pair corresponding to user device 210 and may store a copy of the private key/public key pair associated with user device 210 in memory.

The private key/public key pair and the UWT application may be sent to user device 210 (block 710). For example, application server 220 may send a copy of the private key/public key pair and the UWT application to user device 210. User device 210 may receive the private key/public key pair and UWT application and may store the private key/public key pair and UWT application in the memory of user device 210.

Figure 8:
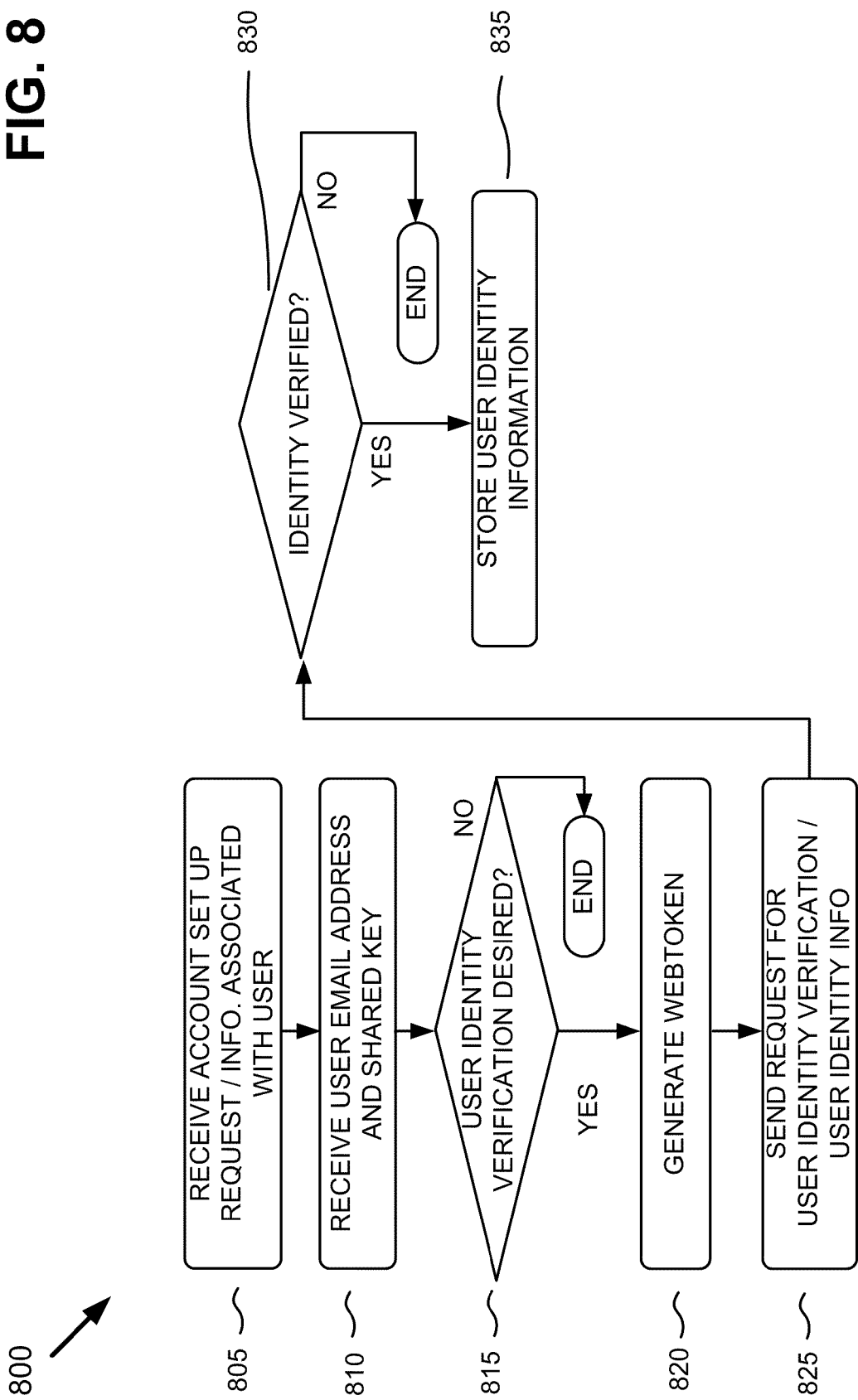
FIG. 8 is a flow chart of an exemplary process for setting up ubiquitous webtoken access with a particular website.
Figure 9:
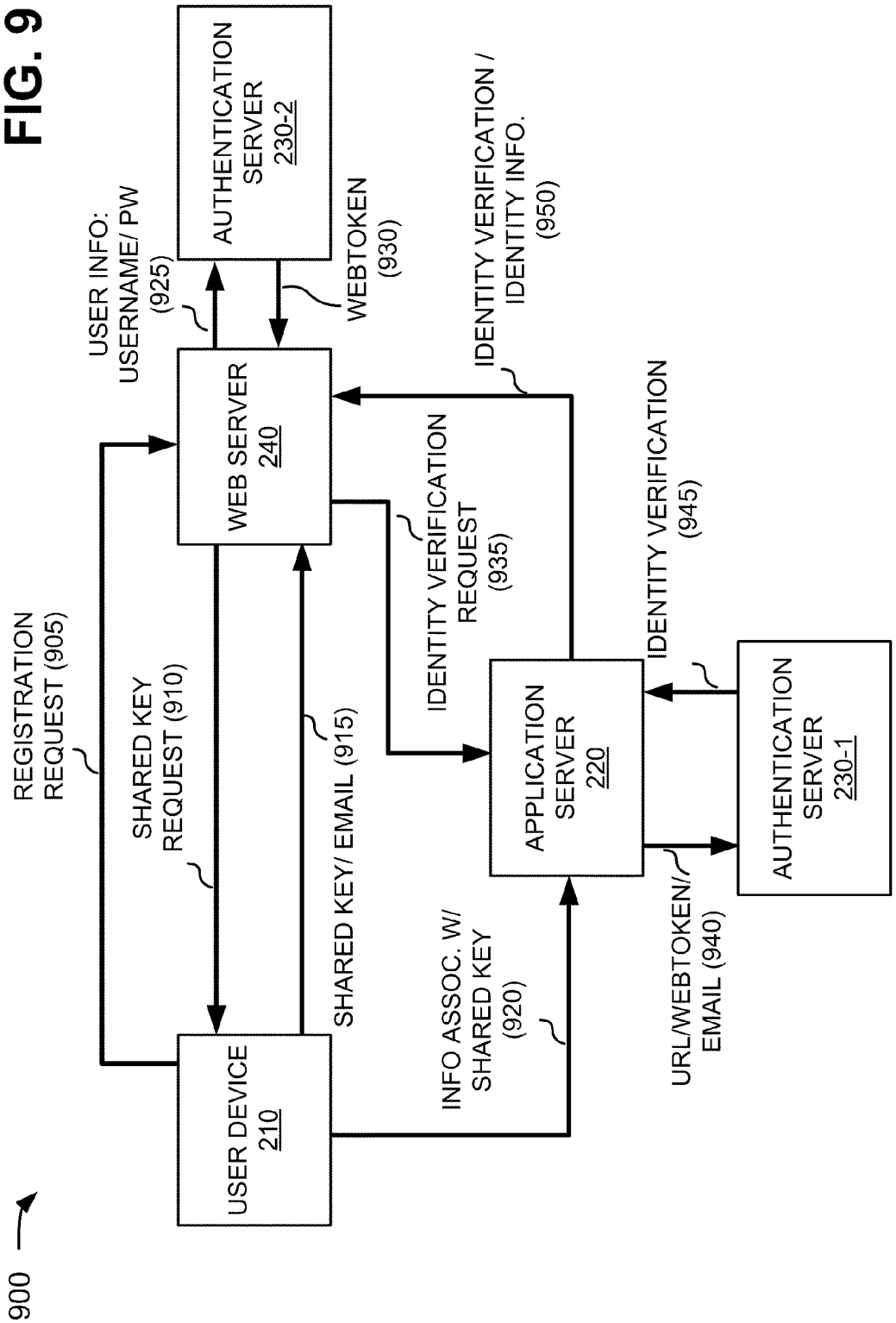
FIG. 9 is a diagram illustrating an exemplary ubiquitous webtoken set-up operation capable of being performed by an exemplary portion of the network of FIG. 2.

FIG. 8 is a flow chart of an exemplary process 800 for setting up webtoken access with a particular website within an exemplary portion of network 200 (FIG. 2). In one implementation, some or all of process 800 may be performed by web server 240 interfacing with user device 210, authentication server 230-2, authentication server 230-1 and/or application server 220. In another implementation, some or all of process 800 may be performed by one or more devices separate from or in combination with web server 240. FIG. 9 is an exemplary webtoken operation 900 capable of being performed by an exemplary portion of network 200. Process 900 will be discussed below with corresponding references to operation indicators of webtoken operation 900 of FIG. 9.

Process 800, of FIG. 8, may include receiving a set up request from user device 210 (block 805). For example, web server 240 may receive, as indication 905 in FIG. 9, a request to set up two-factor authentication access from user device 210. The request may include information associated with user device 210 (e.g., MDN, username, password and/or PIN, etc.).

The user's email address and shared key may be received (block 810). For example, as shown in FIG. 9, web server 240 may receive indication 905 and may prompt user device 210, as indication 910 in FIG. 9, for an email address of the user (e.g., the user of user device 210) and a shared key. User device 210 may receive indication 910 and may retrieve from the memory of user device 210, the private key (e.g., the private key portion of the private key/public key pair) and the UWT application to generate a shared key unique to the particular website.

The UWT application may generate a shared key, that is unique to a particular website, using a cryptographic public key infrastructure signature (PKISign) algorithm of the private key (e.g., associated with the identity of the user of the user device 210), a website domain name and/or a numerical weight and/or value associated with a certain user identity selection (e.g., "UIS") specified by the user of user device 210. In one implementation, the UWT application may generate the shared key as follows: shared key=Base64(XOR-Fold(PKISign(private key, domain name+UIS))).

The UWT application, therefore, may enable user device 210 to generate a unique shared key for each website that requires two-factor authentication and has acquired the publicly available UWT application. It should be understood that the cryptographic public key infrastructure signature algorithm may render the derivation of the private key, from the shared key, cryptographically infeasible (e.g., impractical given the present and projected state of technology or mathematical practice). Furthermore, use of the cryptographic public key infrastructure signature algorithm to generate a shared key, that renders derivation of the private key cryptographically infeasible, is provided for illustration purposes only. There may be other cryptographic functions and/or mathematical methods that the UWT application could use to generate a shared key that renders derivation of the private key cryptographically infeasible.

For example, the user of user device 210 may wish to make an online purchase of a personal item from a particular website (e.g., with a domain name of "acmestores.com") and may choose a particular identity, such as the user's personal identity (e.g., personal identity 606 "john.smith@zmail.com" from identity registration table 600) (FIG. 6A). Furthermore, the user may further refine the user identity selection and may specify that the only identity information to be disclosed to the website is the user's name and email address associated with the user's personal identity 606 (e.g., Legal name: "John Smith"; email: "john.smith@zmail.com") (FIG. 6A). The UWT application may assign a numerical weight and/or value to the user identity selection. For example, in one implementation, if the user wishes to remain anonymous, the UWT application may assign a value of zero; if the user wishes to share only an email address, the UWT application may assign a value of one, if the user wishes to share an email address and the user's name, the UWT application may assign a value of two and/or if the user wishes to provide an email address, the user's name and one or more of the user's addresses, the UWT application may assign a value of four, etc. It should be understood that there are countless permutations and/or combinations to assigning weights and/or values to varying user identity selections. The example described herein is provided for illustration purposes only and does not limit the invention.

The UWT application, using, for example, the cryptographic function PKISign discussed above, may generate a unique shared key (e.g., A3x91) based on the private key, the domain name (e.g., acmestores.com) and/or the user identity selection (e.g., value of two, corresponding to the user's desire to disclose the email and name information). User device 210 may automatically send, as indication 915 in FIG. 9, the shared key and email address to web server 240. Furthermore, user device 210 may store the shared key and the parameters associated with generating the shared key, such as the domain name and the user identity selection in memory of user device 210 and may send, as indication 920 in FIG. 9, the shared key and shared key parameters to application server 220. Application server 220 may receive indication 920 and may store the shared key and shared key parameters in memory.

In another example, the user's email address and/or the shared key may be provided to web server 240 in another way. For example, the user may use a first device (e.g., user device 210) to generate the shared key unique to the particular website, and a second device (e.g., separate from user device 210)

to provide the email address and/or shared key to web server 240. In this example, the first device may display (or otherwise provide) the shared key to the user, and the user may enter the shared key and/or the email address into the second device (e.g., into a user interface, of web server 240, presented on the second device). The second device may then provide the shared key and/or the email address to web server 240.

In yet another example, user device 210 may generate the shared key and may send the shared key and/or the email address to web server 240 (via user device 210 or another device) without receiving indication 910 or as part of indication 905.

If user identity verification is desired (block 815-YES), then a webtoken may be generated (block 820) and a request for user identity verification and user identity information may be sent (block 825). For example, if the website is affiliated with a token administrator, user identity information and user identity verification may be obtained. An affiliated website may be affiliated with a token administrator for due consideration (e.g., a fee in exchange for authentication services, identity information, and/or other services, etc.). In the present example, web server 240 may receive indication 915 from user device 210 and may send the shared key and information associated with the user device 210 to authentication server 230-2 as indication 925 in FIG. 9. Authentication server 230-2 may receive indication 925 and may retrieve the UWT application from memory.

The UWT application, retrieved from authentication server 230-2 memory, may generate a webtoken using the shared key and a particular time interval. In one implementation, a webtoken may include a string of characters (e.g., numeric, alphabetic, or alphanumeric) that may be cryptographically calculated, from a key (e.g., a shared key and/or another type of key, etc.) and a time interval, such that the derivation of the key, from the webtoken, may be rendered cryptographically infeasible (e.g., impractical given the present and projected state of technology or mathematical practice). In another implementation, a webtoken, may be generated by a publicly available cryptographic secure hashing algorithm (e.g., Secure Hash Algorithm (SHA-1)) of a shared key and a time interval based on a time-of-day clock according to the formula: webtoken=Base64(XORFold(SHA1(Sharedkey+timeinterval))).

For example, a webtoken generated at a particular time of day may be different from a webtoken that is generated at a different time of day (i.e., time-variant) depending on the time interval, which may determine the life of the webtoken. The time interval, as used in this example, may be defined by the UWT application (e.g., 30 seconds, one minute, five minutes, etc.) plus any time drift (e.g., clock error) that the UWT application deems acceptable (e.g., 1 second, 5 seconds, 10 seconds, 1 minute, etc.). Thus, if a second webtoken with a particular lifespan (e.g., 60 seconds) is generated within 63 seconds after a first webtoken, the UWT application may generate an identical (e.g., matching) second webtoken if the UWT application accepts time drift of at least three seconds. By contrast, the UWT application may generate a different (e.g., non-matching) second webtoken if the UWT application only accepts clock errors of less than three seconds.

In another example, the UWT application may use the cryptographic secure hashing algorithm, SHA-1, and the shared key (e.g., A3x91) received from user device 210, to generate a time-variant webtoken (e.g., 7skI37) in accordance with, for example, the webtoken formula discussed above, and authentication server 230-2 may send the webtoken to web server 240 as indication 930 in FIG. 9. Web server 240 may receive indication 930 and may send, as indication 935 in FIG. 9, a request for user identity verification and user identity information to application server 220. Indication 935 may include a domain name (e.g., acmestores.com), a webtoken (e.g., 7skI37) and an email address associated with the user device 210 (e.g., john.smith@zmail.com).

It should be understood that the cryptographic secure hashing algorithm, SHA-1, may render the derivation of the shared key, from the webtoken, cryptographically infeasible. Furthermore, use of the cryptographic secure hashing algorithm, SHA-1, to generate a webtoken that renders derivation of the shared key cryptographically infeasible, is provided for illustration purposes only. There may be other cryptographic functions and/or mathematical methods that the UWT application could use instead of, or in addition to, the SHA-1 algorithm to generate a webtoken that renders derivation of the shared key cryptographically infeasible.

If, however, user identity verification and user identity information are not desired (block 820—NO), then process 800 may end. For example, a particular website may not be affiliated with a token administrator and may, therefore, utilize information associated with the user that the website was able to obtain through other channels to verify the identity of the user of user device 210.

Another webtoken may be generated to verify the user's identity. For example, application server 220 may receive indication 935 and may send, as indication 940 in FIG. 9, the website domain name, the received webtoken and the email address to authentication server 230-1 to verify the user identity. Authentication server 230-1 may receive indication 940 and may retrieve from memory, the UWT application and information associated with the shared key (e.g., user identity selection, domain name, etc.) corresponding to the received email address.

Authentication server 230-1 may, in a manner similar to that discussed above (at block 820), generate a webtoken from the shared key retrieved from memory and may compare the generated webtoken to the webtoken received from web server 240. Authentication server 230-1 may authenticate user device 210 if the generated webtoken and the received webtoken match. Furthermore, authentication server 230-1 may verify that the email address associated with user device 210 corresponds to the shared key and user device 210. Authentication server 230-1 may send, as indication 945 in FIG. 9, an authentication message to application server 220.

If the user's identity is not verified (block 830—NO), then the account may not be set up and process 800 may end. If, however, the user's identity is verified (block 830—YES), then identity information may be stored (block 840). For example, application server 220 may receive indication 945 and may send an identity verification message, as indication 950 in FIG. 9, to web server 240. The identity verification message may include identity information associated with user device 210, such as the user's name and email address (e.g., Legal name: "John Smith" 614; email: "john.smith@zmail.com" 614) (FIG. 6B). The identity information may be derived from the received email address (e.g., john.smith@zmail.com); the user identity selection (e.g., with an assigned value of two) used by user device 210 to generate the shared key associated with the received domain name (e.g., acmestores.com). Web server 240 may receive indication 950 and may store the identity information associated with user device 210 in memory.

Figure 10:
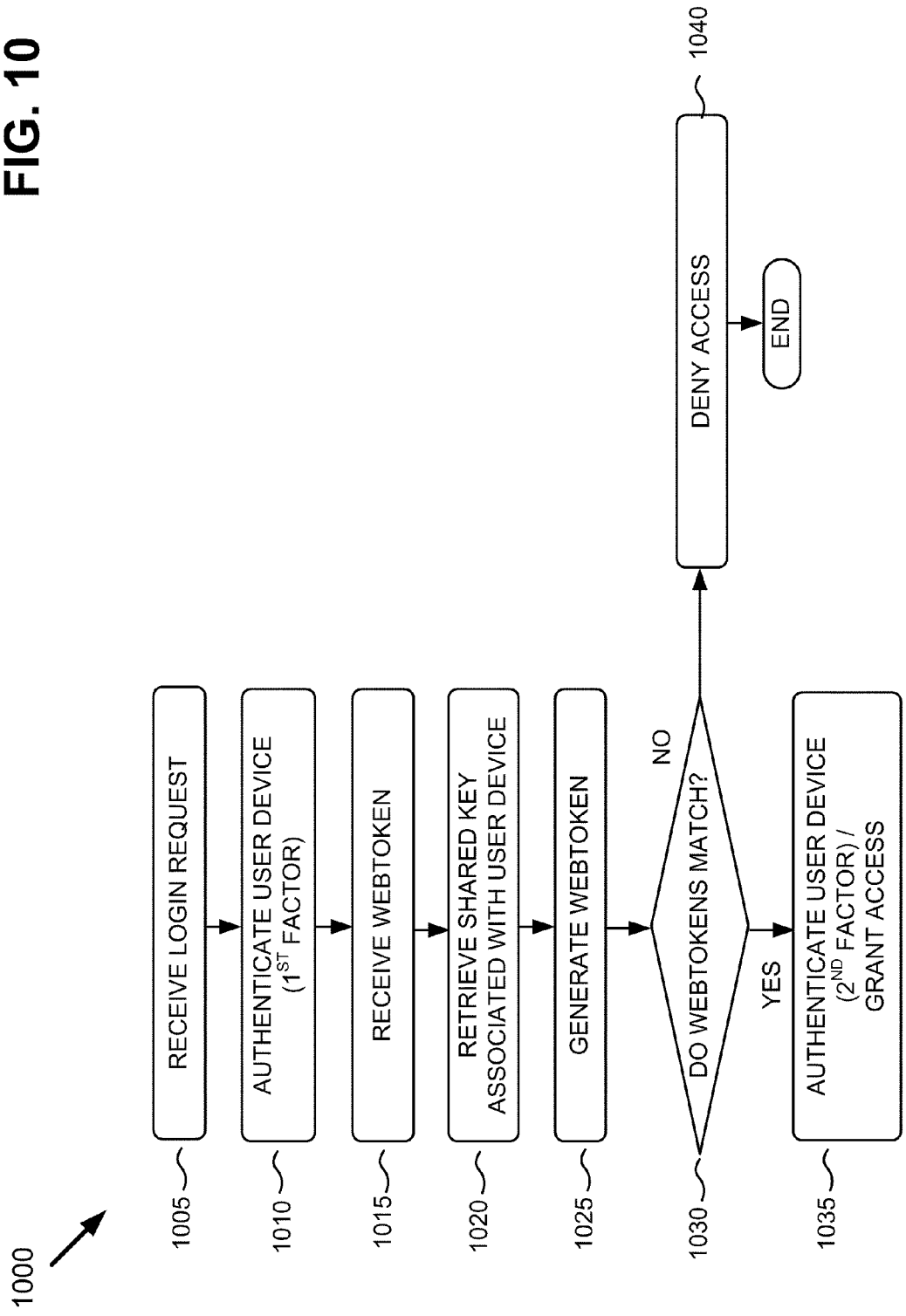
FIG. 10 is a flow chart of an exemplary process for logging into a website using a ubiquitous webtoken.

FIG. 10 is a flow chart of an exemplary process 1000, for accessing a website using a webtoken, performed within an exemplary portion of network 200 (FIG. 2). In one implementation, some or all of process 1000 may be performed by web server 240 interfacing with user device 210, authentication server 230-2, application server 220 and/or authentication server 230-1. In another implementation, some or all of process 1000 may be performed by one or more devices separate from or in combination with web server 240.

Process 1000, of FIG. 10, may include receiving a login request (block 1005). For example, web server 240 may receive, from user device 210, a login request for access to a website associated with web server 240. The request may include information associated with user device 210 (e.g., MDN, username, password and/or PIN, etc.). Web server 240 may send the login request to authentication server 230-2 to perform the knowledge-based authentication factor.

User device 210 may be authenticated (first factor) (block 1010). For example, authentication server 230-2 may receive the login request and may retrieve from memory, information associated with user device 210. Authentication server 230-2 may compare the information associated with the user device 210 received from web server 240 with information associated with user device 210 retrieved from memory. Authentication server 230-2 may authenticate user device 210, regarding the knowledge-based authentication factor (e.g., the first factor), if the received information associated with user device 210 matches the information associated with user device 210 stored in the memory of authentication server 230-2. Authentication server 230-2 may send an authentication message to web server 240. If, however, authentication server 230-2 determines that the received information associated with user device 210 does not match the information associated with user device 210 stored in memory, the authentication server 230-2 may not send an authentication message to web server 240 and user device 210 may be denied access to the website and/or process 1000 may end.

A webtoken may be received (block 1015), a shared key may be retrieved (block 1020) and a webtoken may be generated (block 1025). For example, user device 210 may retrieve the shared key associated with the website domain name (e.g., acmestore.com) from memory (e.g., the memory of user device 210) and, in a manner similar to that discussed above (at block 820) (FIG. 8), may direct the UWT application to generate a webtoken. User device 210 may automatically send the webtoken and an email address associated with the user (e.g., the user of user device 210) (e.g., john.smith@zmail.com), to web server 240.

In another example, the webtoken and/or the email address may be provided to web server 240 in another way. For example, the user may use a first device (e.g., user device 210) to generate the webtoken, and a second device (e.g., separate from user device 210) to send the webtoken and/or the email address to web server 240. In this example, the first device may display (or otherwise provide) the webtoken to the user, and the user may enter the webtoken and/or the email address into the second device (e.g., into a user interface, of web server 240, presented on the second device). The second device may then provide the webtoken and/or the email address to web server 240.

Web server 240 may receive the webtoken and email address and may send the webtoken and email address to authentication server 230-2 to perform a second authentication operation. Authentication server 230-2 may receive the webtoken and email address and may retrieve from memory (e.g., the memory of authentication server 230-2) the shared key associated with the received email address and/or information associated with user device 210 (e.g., username, password, and/or PIN, etc.). Authentication server 230-2 may, in a manner similar to that discussed above (at block 820) (FIG. 8), direct the UWT application to generate a webtoken.

If the webtokens match (block 1030—YES) then the user device may be authenticated (second factor) and access may be granted (block 1035). For example, authentication server 230-2 may compare the received webtoken with the generated webtoken. Authentication server 230-2 may determine that the received webtoken matches the generated webtoken and may authenticate user device 210 regarding the physical authentication factor (e.g., the second factor). Authentication server 230-2 may send an authentication message to web server 240. Web server 240 may receive, from authentication server 230-2, the authentication message regarding the first factor and the authentication message regarding the second factor and may grant user device 210 access to the website.

If the webtokens do not match (block 1030—NO), then access may be denied and process 1000 may end (block 1040). For example, if authentication server 230-2 determines that the received webtoken does not match the generated webtoken, then authentication server 230-2 may not authenticate user device 210 and may deny user device 210 access to the website.

Figure 11:
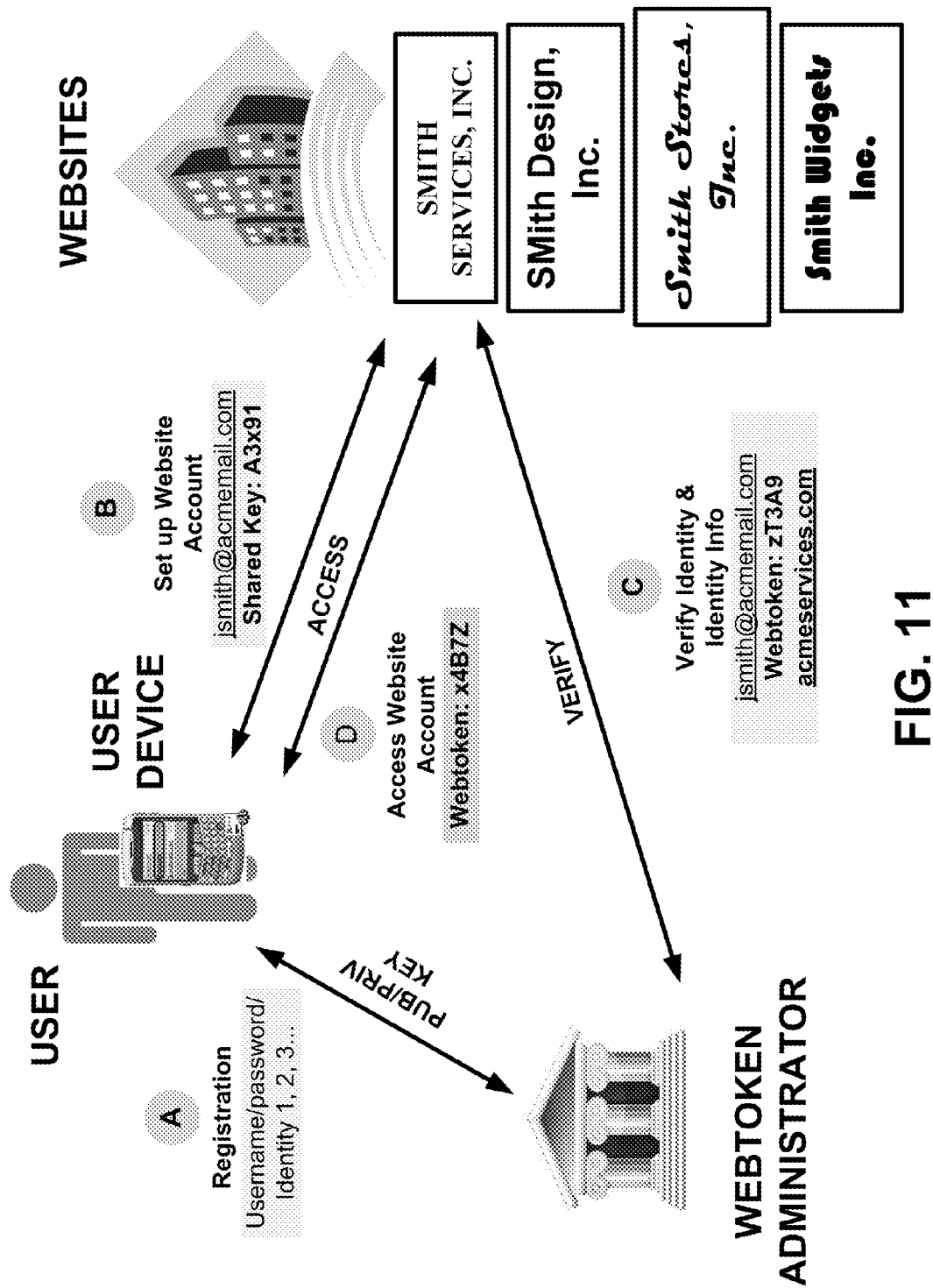
FIG. 11 is a simplified diagram of an exemplary ubiquitous webtoken interaction between a user device, a website and a ubiquitous webtoken administrator.

FIG. 11 is a simplified diagram of an exemplary webtoken interaction between a user device, a website and webtoken administrator within an exemplary portion of network 200 (FIG. 2). As shown in FIG. 11, assume that John Smith, user of the user device, is employed by Acme Business, Inc. and has a business email address of jsmith@acmemail.com. Assume further, that John Smith, in the course of his duties with Acme Business, Inc., needs to access the website of Smith Services, Inc. (e.g., with a domain name of: "smithservices.com") to acquire goods and/or services for Acme Business, Inc.

John Smith may register the user device and one or more identities to obtain a private key/public key pair (indication A). For example, in a manner similar to that discussed above (at blocks 706-710) (FIG. 7), the user device may interact with the webtoken administrator to register the user device and/or one or more identities associated with the user of the user device. The registered identities may include an anonymous identity (e.g., identity 608 of identity registration table 600) (FIG. 6A); a personal identity (e.g., identity 606 of identity registration table 600); a business identity (e.g., identity 604 of identity registration table 600); and/or one or more other permutations and/or combinations of identifying information that the user desires to include in one or more particular identities. In return for registering, the user device may receive a private key/public key pair and/or the UWT application from the webtoken administrator.

Smith Services, Inc. may receive an account set-up request from John Smith's user device (indication B). For example, a website (e.g., with a domain name of "smithservices.com") may receive a request from the user device to set up an online account that may require a username, password and/or PIN to satisfy the knowledge-based authentication factor and a webtoken to satisfy the physical authentication factor of a two-factor authentication access scheme. Assume that Smith Services has obtained and integrated the publicly available UWT application. In a manner similar to that described above (at blocks 805-815) (FIG. 8), a user device may set up webtoken access to a website (e.g., smithservices.com) by generating a shared key (e.g., A3x91) that is unique to the particular website. The user device may send the shared key and an email address (e.g., jsmith@acmemail.com) to the website. Additionally, the user device may send information associated with the shared key to the webtoken administrator.

Smith Services, Inc. may interact with a webtoken administrator for user identity verification services (indication C). For example, in a manner similar to that discussed above (at blocks 820-835) a website may receive the shared key and email address associated with the user device and may generate a webtoken (e.g., zT3A9) from the shared key (e.g., A3x91). The website may send a request for identity verification of the user of the user device to a token administrator, where the request may include the generated webtoken (e.g., zT3A9), domain name (e.g., smithservices.com) and/or the received email address (e.g., jsmith@acmemail.com).

The token administrator may receive the identity verification request and may retrieve, from memory, the registration information, the shared key, and/or the user identity selection corresponding to the received email address. In a manner similar to that described above (at block 820) (FIG. 8), the token administrator may generate a webtoken from the retrieved shared key and may verify John Smith's identity if the generated webtoken matches the received webtoken (e.g., zT3A9). The token administrator may send an identity verification message to the website and may verify that John Smith's identity corresponds to the email (e.g., jsmith@acmemail.com) and webtoken received by the website.

Furthermore, the webtoken administrator may send identity information to the website. The identity information may correspond to the particular registered identity and/or the user identity selection that John Smith specified when the shared key was generated on the user device. For example, if the shared key was generated using John Smith's business identity 604 (e.g., identity name: jsmith@acmemail.com) (FIG. 6A) and the user identity selection value was equal to four, then the token administrator may send, to Smith Services, Inc., most or all of the information specified in John Smith's registered business identity (e.g., identity 604 of identity registration table 600) (FIG. 6A). Specifically, for example, the token administrator may send, to Smith Services, Inc., the user's name (e.g., legal name: "Jonathon J. Smith"); business email address (e.g., email: "jsmith@acmemail.com"); business telephone number (e.g., phone No: "202-222-2222"); business addresses (e.g., physical/shipping/billing address: "$8^{th}$ St. New York, N.Y.") and/or name of business or organization (e.g., Org. Name: "Acme Business") (FIG. 6A). Smith Services, Inc. may receive the identity information and may store the identity information in memory.

At some future point, Smith Services, Inc., may receive a login request from John Smith's user device (indication D). For example, in a manner similar to that discussed above (at blocks 1005-1040) (FIG. 10), after authenticating the user device on the basis of the knowledge-based authentication factor (e.g., password, username, PIN, etc.), the website may prompt the user device to provide a webtoken. The user device may retrieve a shared key, such as the shared key that was generated to set up the account with the particular website (e.g., A3x91), and may direct the UWT application to generate a webtoken (e.g., x4B7Z). The user device may send the webtoken to the website and the website may retrieve the shared key associated with the user device (e.g., based on the username, password, PIN, etc. provided during the account set up process). The website may direct the UWT application to generate a webtoken for comparison against the received webtoken. If the website determines that the received webtoken matches the generated webtoken, the website may authenticate the user device with respect to the physical authentication factor and may grant access to the user device.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7, 8 and 10, the order of the blocks may be modified in other implementations. Further, non-dependent blocks may be performed in parallel.

The term "user device," as used herein, may correspond to a "user" of a user device instead of, or in addition to, the user device. The term "user," as used herein, may correspond to a "user device" instead of, or in addition to, the user.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as an ASIC or FPGA, or a combination of hardware and software (e.g., a processor executing software).

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising
    receiving, by at least one device and from a user device, a first request to set up an account;
    receiving, by the at least one device, a shared key, where the shared key is generated based on a private key, of a private key/public key pair corresponding to the user device, information associated with the at least one device, and information regarding an identity selection, from a plurality of user identity information, associated with a user of the user device;
    storing, by the at least one device, the shared key in a memory;
    receiving, by the at least one device and from the user device, a second request to log in to the account, where the second request includes a first webtoken generated based on the shared key and a first time interval at which the first webtoken is generated;
    retrieving, by the at least one device and based on the second request, the shared key stored in the memory;
    generating, by the at least one device, a second webtoken based on the shared key, retrieved from the memory, and a second time interval at which the second webtoken is generated;
    comparing, by the at least one device, the second webtoken and the first webtoken;
    authenticating, by the at least one device, the user device when the second webtoken matches the first webtoken; and
    permitting, by the at least one device, the user device access to the account based on the authentication.

2. The method of claim 1, where generating the second webtoken includes using a cryptographic secure hashing algorithm to calculate the second webtoken based on the shared key and the second time interval, where the second time interval includes a time-of-day clock value and a clock error set for the cryptographic secure hashing algorithm.

3. The method of claim 2, where generating the second webtoken, using the cryptographic secure hashing algorithm, renders derivation, of the shared key, cryptographically infeasible.

4. The method of claim 1, further comprising generating the shared key using a cryptographic public key infrastructure signature algorithm based on the private key, the information associated with the at least one device, and the information regarding the identity selection.

5. The method of claim 4, where generating the shared key, using of the cryptographic public key infrastructure signature algorithm, renders derivation of the private key, of the private key/public key pair, cryptographically infeasible.

6. The method of claim 1, where the information associated with the at least one device includes a domain name associated with the at least one device, and where the information regarding the identity selection includes a numeric value associated with the identity selection from the plurality of user identity information.

7. The method of claim 1, where the shared key is time-invariant and the first webtoken and the second webtoken are time-variant.

8. The method of claim 1, where the information regarding the identity selection includes a numeric value that is based on particular identity information, selected by the user of the user device, from the plurality of user identity information.

9. The method of claim 1, where the first request further includes first information associated with the user device, the method further comprising:
retrieving second information associated with the user device;
comparing the first information and the second information; and
further authenticating the user device when the first information matches the second information.

10. The method of claim 1, further comprising:
generating a third webtoken based on the shared key and a third time interval at which the third webtoken is generated;
sending an identity verification request to another device, where the identity verification request includes the third webtoken, the information associated with the at least one device, and information associated with the user device; and
receiving, from the other device, the identity verification and particular identity information associated with the user of the user device, where the identity verification indicates that the third webtoken corresponds to the particular identity information associated with the user of the user device.

11. A system comprising:
one or more first devices, where at least one of the one or more first devices connects to a second device,
the one or more first devices are to:
receive, from the second device, a first request to set up an account, where the first request includes a shared key and information associated with the second device, where the shared key is calculated based on a private key, of a private key/public key pair, and information regarding an identity selection, from a plurality of user identity information, associated with a user of the second device,
store the shared key in a memory,
receive, from the second device, a second request to log in to the account, where the second request includes a first webtoken and information associated with the second device, where the first webtoken is calculated based on the shared key and a first time interval at which the first webtoken is calculated,
retrieve the shared key, from the memory, based on the second request,
generate a second webtoken based on the shared key, retrieved from the memory, and a second time interval at which the second webtoken is calculated,
perform an authentication operation by comparing the first webtoken and the second webtoken, and
permit the second device to access the account when the first webtoken matches the second webtoken.

12. The system of claim 11, where at least one of the one or more first devices connects to a third device,
where the one or more first devices are further to:
generate a third webtoken based on the shared key and a third time interval at which the third webtoken is generated,
send, to the third device, an identity verification request that includes the third webtoken, information associated with the one or more first devices, and the information associated with the second device, and
receive, from the third device, an identity verification message that includes identity information associated with the user of the second device, where the identity information is determined based on the information regarding the identity selection.

13. The system of claim 11, where the shared key is unique to a particular website and is further calculated based on a domain name associated with the particular website.

14. The system of claim 11, where the one or more first devices are further to:
store user information associated with the second device,
retrieve, based on the second request, the stored information, and
perform an additional authentication operation by comparing the stored information and the information associated with second device that is received in the second request.

15. The system of claim 11, where the shared key is calculated using a cryptographic algorithm based on the private key, of the private key/public key pair, a domain name of a particular website, and the information regarding the identity selection, where the cryptographic algorithm renders derivation, of the private key, cryptographically infeasible.

16. The system of claim 11, where the one or more first devices are to:
generate the second webtoken using a cryptographic algorithm based on the shared key and the second time interval, where the cryptographic algorithm renders derivation, of the shared key, cryptographically infeasible.

17. A system comprising:
a first device connected to a user device and a second device,
the first device is to:
receive, from the user device, a shared key, information associated with the user device, and permission indicators associated with user identity information,
receive, from the second device, a request for an identity verification, where the request includes a first webtoken, information associated with the second device, and information associated with the user device, retrieve, based on the request, the shared key and the permission indicators, generate a second webtoken based on the shared key and a time interval at which the second webtoken is generated, perform an authentication operation by comparing the first webtoken and the second webtoken, retrieve identity information, associated with the user of the user device, based on the permission indicators when the first webtoken matches the second webtoken, and send, to the second device, an identity verification message that includes the retrieved identity information.

18. The system of claim 17, where the first device is further to:

receive, from the user device, a request to register the user device, where the request, to register the user device, includes information associated with the user device and user identity information associated with a user of the user device, generate, based on the request, a private key/public key pair corresponding to the user device, and send a registration message to the user device that includes the private key / public key pair, where the shared key is generated based on the private key / public key pair.

19. The system of claim 18, where the shared key is time-invariant and the first webtoken and the second webtoken are time-variant.

20. The system of claim 18, where the shared key is unique to a particular website.

* * * * *